United States Patent
Little

(10) Patent No.: US 8,641,149 B2
(45) Date of Patent: Feb. 4, 2014

(54) RATCHETING VEHICLE HEAD RESTRAINT ASSEMBLY

(75) Inventor: Mark Little, Maidstone (CA)

(73) Assignee: Windsor Machine & Stamping (2009) Ltd, Windsor, Ontario (CA)

( * ) Notice: Subject to any disclaimer, the term of this patent is extended or adjusted under 35 U.S.C. 154(b) by 282 days.

(21) Appl. No.: 13/042,818

(22) Filed: Mar. 8, 2011

(65) Prior Publication Data

US 2011/0221250 A1    Sep. 15, 2011

Related U.S. Application Data

(60) Provisional application No. 61/312,830, filed on Mar. 11, 2010.

(51) Int. Cl.
*A47C 7/36* (2006.01)
(52) U.S. Cl.
USPC .......................................................... 297/408
(58) Field of Classification Search
USPC .......................................................... 297/408
See application file for complete search history.

(56) References Cited

U.S. PATENT DOCUMENTS

| 4,674,792 | A | * | 6/1987 | Tamura et al. | 297/408 |
| 6,000,760 | A | * | 12/1999 | Chung | 297/408 |
| 6,045,181 | A | * | 4/2000 | Ikeda et al. | 297/216.12 |
| 7,455,363 | B2 | * | 11/2008 | Chung | 297/407 |
| 2007/0152487 | A1 | * | 7/2007 | Brockman et al. | 297/408 |
| 2011/0175421 | A1 | * | 7/2011 | Grable | 297/408 |

* cited by examiner

*Primary Examiner* — David Dunn
*Assistant Examiner* — Alexander Harrison
(74) *Attorney, Agent, or Firm* — Quinn Law Group, PLLC

(57) ABSTRACT

A ratcheting pivot mechanism for coupling a head rest portion of a vehicle head restraint assembly to a post portion of a vehicle head restraint assembly includes a first pivot arm, a second pivot arm pivotably connected to the first pivot arm, a movable ratchet member pivotably connected to the second pivot arm, and a spring disposed between the second pivot arm and the movable ratchet member. The first pivot arm has a fixed ratchet member, which the movable ratchet member is configured to selectively engage. The spring is configured to apply an engaging force to the movable ratchet member when the movable ratchet member is in a first position, and configured to apply a disengaging force to the movable ratchet member when the movable ratchet member is in a second position.

18 Claims, 4 Drawing Sheets

RATCHETING VEHICLE HEAD RESTRAINT ASSEMBLY

CROSS-REFERENCE TO RELATED APPLICATIONS

This application claims the benefit of U.S. Provisional Patent Application No. 61/312,830, filed Mar. 11, 2010, which is hereby incorporated by reference in its entirety.

TECHNICAL FIELD

The present invention relates generally to ratcheting vehicle head restraint assemblies.

BACKGROUND

Many vehicles, such as automobiles, include a headrest or head restraint atop an occupant's seat and in a position adjacent the occupant's head. Head restraints are typically cushioned for comfort, are height adjustable, and most are commonly finished in the same material as the rest of the seat. When travelling in an automobile, a properly adjusted headrest can reduce the severity of neck injuries such as whiplash in the event of a collision.

SUMMARY

A ratcheting pivot mechanism of a vehicle head restraint assembly includes a first pivot arm, a second pivot arm pivotably connected to the first pivot arm, a movable ratchet member pivotably connected to the second pivot arm, and a spring operably disposed between the second pivot arm and the movable ratchet member. The spring may, for example, be an omega spring.

The first pivot arm may have a fixed ratchet member, which the movable ratchet member may be configured to selectively engage, such as by interconnecting a plurality of ratchet teeth disposed on each of the respective ratchet members. The spring is configured to apply an engaging force to the movable ratchet member when the movable ratchet member is in a first position, and may be configured to apply a disengaging force to the movable ratchet member when the movable ratchet member is in a second position. In an embodiment, the movable ratchet member may pass through an over-center position when transitioning between the first position and the second position.

The movable ratchet member may also include a reset pin that lies within a reset window defined by the first pivot arm. The reset window may include a first end wall and a second end wall, the first and second end walls respectively being at opposite sides of the reset window. Interaction between the reset window and the reset pin may urge the movable ratchet member to move between the first position and the second position. More specifically, interaction between the reset pin and the first end wall urges the movable ratchet member into the first position, and interaction between the reset pin and the second end wall urges the movable ratchet member into the second position.

The above features and advantages and other features and advantages of the present invention are readily apparent from the following detailed description of the best modes for carrying out the invention when taken in connection with the accompanying drawings.

DETAILED DESCRIPTION

Figure 1:
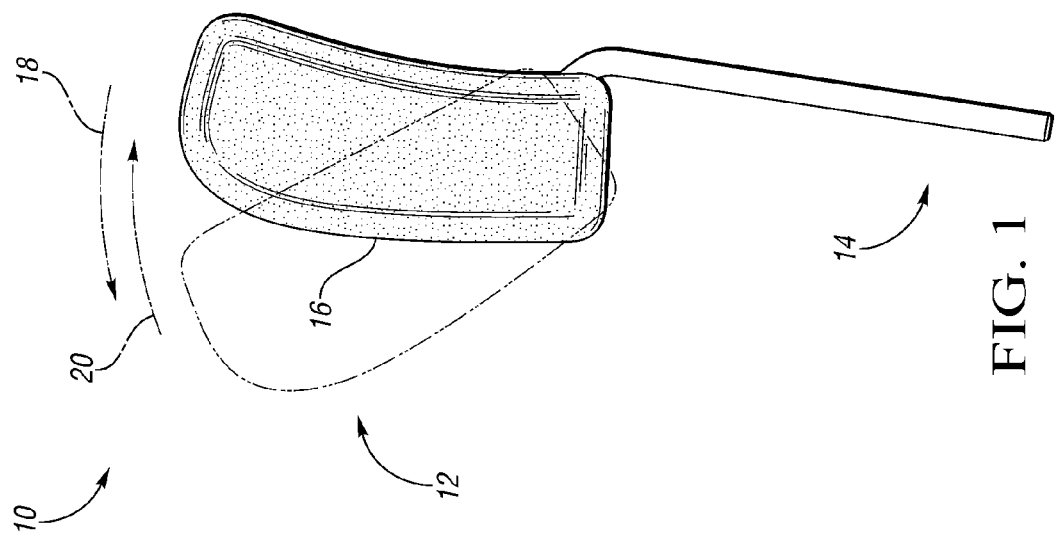
FIG. 1 is a side view of a vehicle head restraint assembly illustrating the head rest portion in two different positions.

Referring to the drawings, wherein like reference numerals are used to identify like or identical components in the various views, FIG. 1 schematically illustrates a vehicle head restraint assembly 10 that includes a head rest portion 12 and a post portion 14. The head rest portion 12 may include a cushion 16, and may be capable of articulating in both a forward direction 18 a rearward direction 20 with respect to the post portion 14 and/or the vehicle. The cushion 16 may be operative to support an occupant's head during normal use, though may be sufficiently resilient to withstand any applied impact forces.

As will be described below, the head rest portion 12 may be manually pulled in the forward direction 18, such as by a user applying a force to a portion of the cushioned restraint 16. Upon such an application of force, the head rest portion 12 may ratchet forward relative to the post portion 14 in a series of incremental steps, where at each step, the head rest portion 12 may be prevented from retreating in a rearward direction 20. Upon reaching a forward extreme position, the ratcheting action may disengage, and allow the head rest portion 12 to return to a rearward extreme position, where the ratchet may re-engage.

Figure 2:
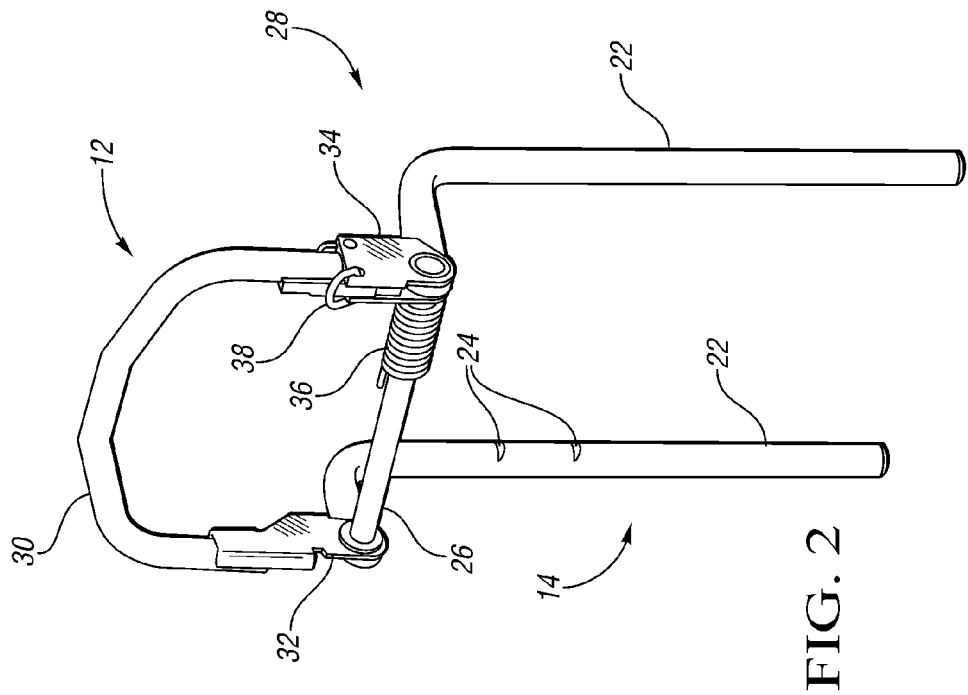
FIG. 2 is an isometric view of a vehicle head restraint assembly frame.

As may be better shown in FIG. 2, the post portion 14 may include two posts 22 that may anchor the head restraint assembly 10 in a vehicle. For example, the posts 22 may extend into a receiving portion of a vehicle seat (not shown), such as an automobile seat, where they may be rigidly restrained from bending, twisting, or other such movement. One or both of the posts 22 may include indentations or notches 24 that may allow a user to adjust the height of the head restraint assembly relative to a locking feature included in the vehicle seat. The posts 22 may be separated by a rigid bar 26 that may ensure that a proper spacing is maintained between the posts, and may further aid in preventing any relative torsional movement.

As further illustrated via the assembly frame 28 shown in FIG. 2, the head rest portion 12 may include a rigid support member 30 that may extend within the cushion 16 (shown in FIG. 1). The head rest portion 12 may be coupled to the post portion 14 through, for example, a pivot mechanism 32 and a ratcheting pivot mechanism 34. The pivot mechanism may, for example, be a simple pivot mechanism 32 that may employ the use of bushings, bearings, and/or other known pivot joints to facilitate relative rotational motion of the head rest portion 12. In an embodiment, the simple pivot mechanism 32 may be replaced by a second ratcheting pivot mechanism 34 that may be similar to the first (the function and operation of which will be described in greater detail below).

The head restraint assembly 10 may further include a return spring 36 that may be configured to apply a biasing force to the head rest portion 12 and urge it in a generally rearward direction 20. The return spring 36 may, for example, be a coil spring wound around, and anchored to the rigid bar 26. The return spring 36 may further include an extension 38 that may apply a spring force/moment to the rigid support member 30. As may be appreciated, other spring configurations may be used and/or the return spring 36 may apply the spring force/moment to other portions of the pivot mechanism 32 or head rest portion 12.

Figure 3:
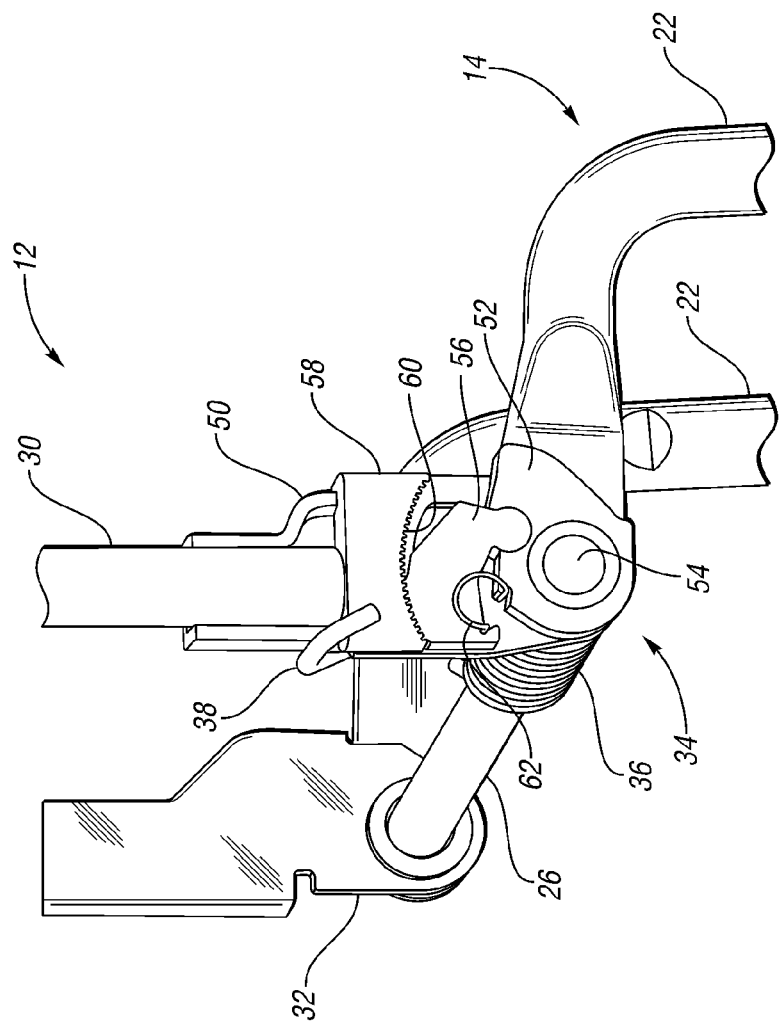
FIG. 3 is a partial cutaway of the ratcheting pivot mechanism shown in FIG. 2.

FIG. 3 shows an enlarged view of the interconnection between the head rest portion 12 and the post portion 14. In particular, FIG. 3 also shows a cutaway view of the ratcheting pivot mechanism 34. The ratcheting pivot mechanism 34 may include a first pivot arm 50 and a second pivot arm 52 that may be pivotably interconnected using a simple pivot mechanism 54. For example, the first and second pivot arms 50, 52 may be pivotably interconnected using a pin, post, bushing, and/or bearing. In a non-limiting example, the first pivot arm 50 may be coupled with the rigid support member 30 of the head rest portion 12, and the second pivot arm 52 may be coupled with a post 22 of the post portion 14.

A movable ratchet member 56 may be pivotably connected with one of the two pivot arms (e.g., the second pivot arm 52), and may be selectively engageable with a ratchet member 58 that is affixed or integrated into the other pivot arm (e.g., the first pivot arm 56) (for clarity, ratchet member 58 may herein be referred to as the "fixed ratchet member 58"). When the movable ratchet member 56 is engaged with the fixed ratchet member 58 (as shown in FIG. 3), the first pivot arm 50 (and coupled head rest portion 12) may be permitted to rotate in a forward direction 18, though may not be permitted to rotate in a rearward position 20. To facilitate this one way motion, each ratchet 56, 58 may respectively have a plurality of teeth 60 that may interconnect with the teeth of the opposing ratchet and may advance in a step-wise manner.

The pivot mechanism 34 may further include a spring 62 disposed between the second pivot arm 52 and the movable ratchet member 56. As will be described in greater detail below, the spring 62 may be configured and/or positioned in a manner where it applies an engaging force to the movable ratchet member 56 when the movable ratchet member 56 is pivotably engaged with the fixed ratchet member 58, and where it applies a disengaging force to the movable ratchet member 56 when the movable ratchet member 56 is disengaged from the fixed ratchet member 58. As such, there may be an over center position where the direction of the biasing provided by the spring 62 may switch between an engaging and disengaging direction.

Figure 4:
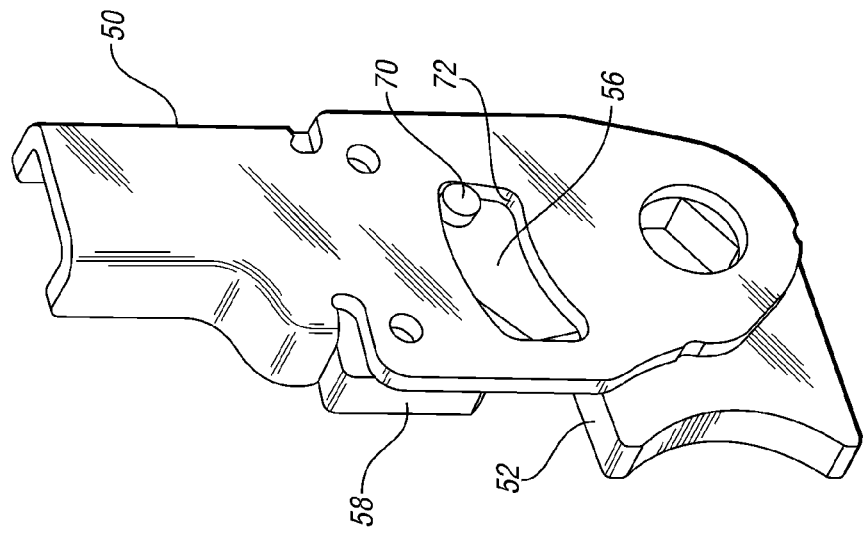
FIG. 4 is a schematic isometric view of a ratcheting pivot mechanism.
Figure 5B:
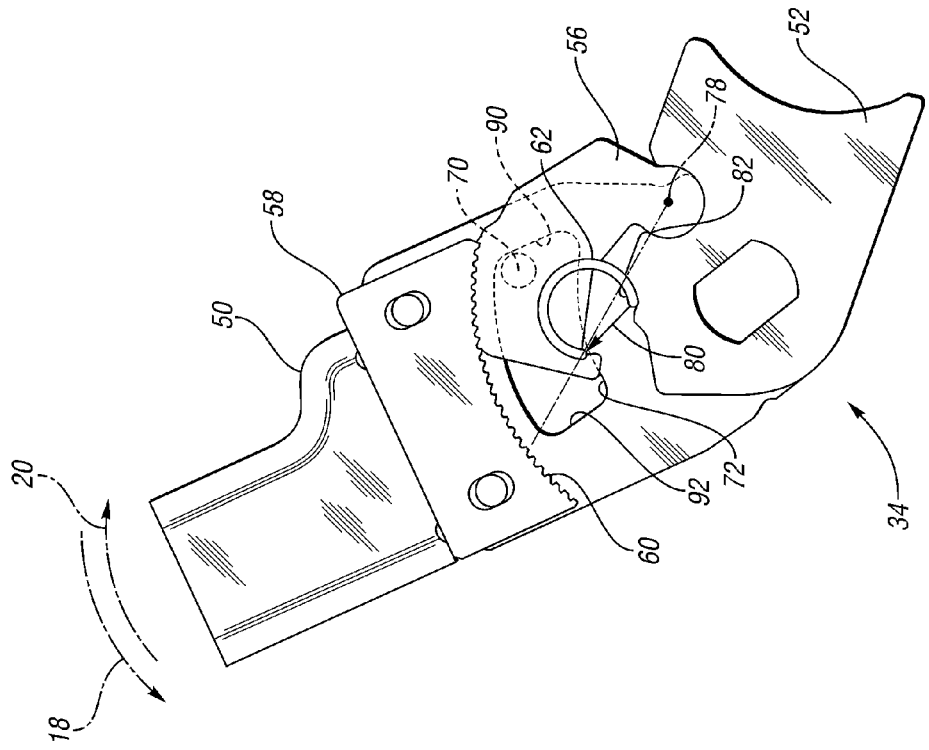
FIG. 5B is a schematic side view of the ratcheting pivot mechanism of FIG. 5A, shown in a second, engaged position.
Figure 5A:
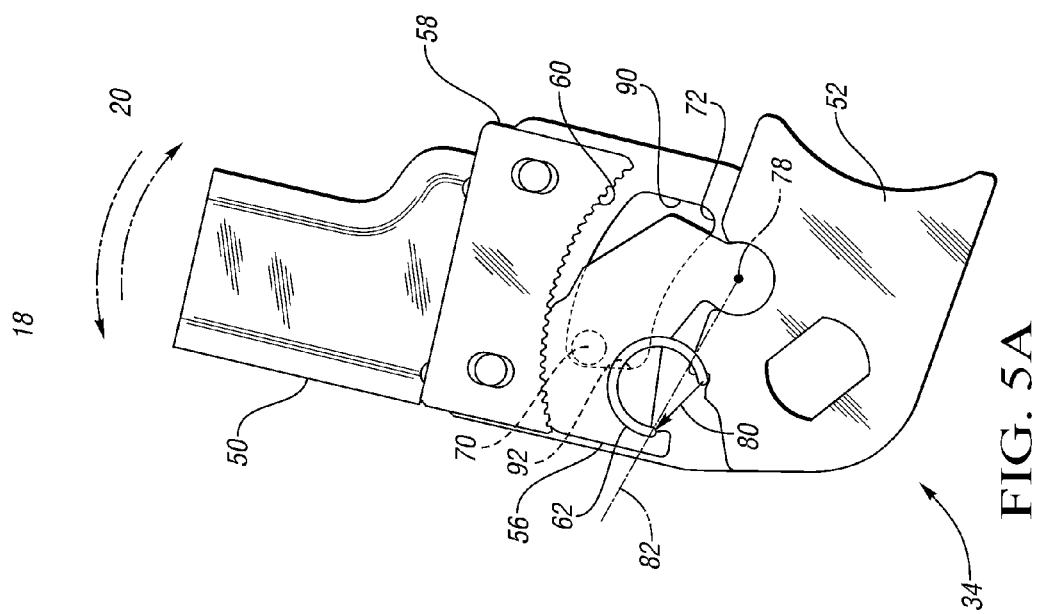
FIG. 5A is a schematic side view of a ratcheting pivot mechanism shown in a first, engaged position.
Figure 5C:
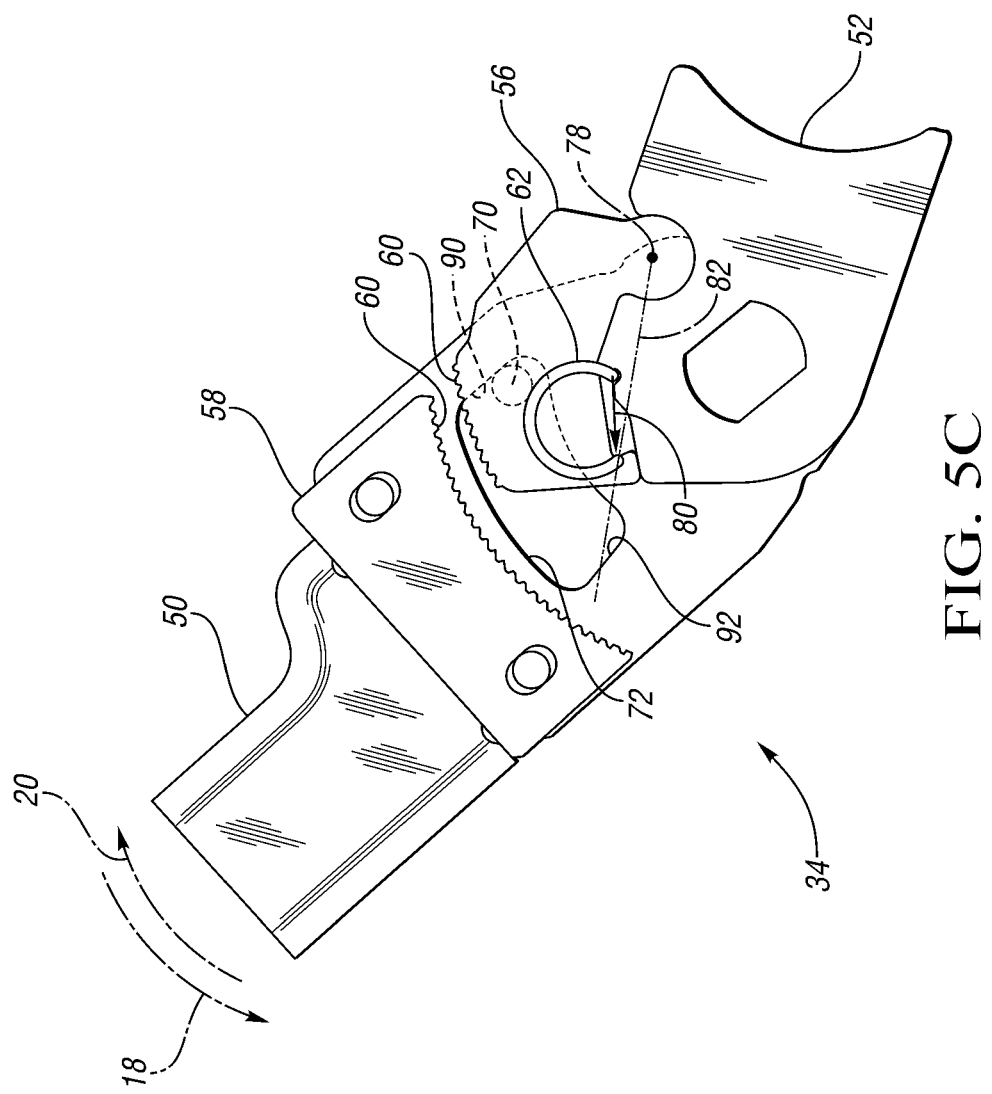
FIG. 5C is a schematic side view of the ratcheting pivot mechanism of FIG. 5A, shown in a disengaged position.

As generally illustrated in the reverse view provided in FIG. 4, and additionally in FIGS. 5A-5C, the first pivot arm 50 may be used to toggle the movable ratchet member 56 between an engaged state and a disengaged state while articulating through its full pivotable range. To accomplish this toggling, the movable ratchet member 56 may include a reset pin 70 that may be rigidly coupled with the ratchet member 56, and that may interact with a reset window 72 defined by the first pivot arm 50. As the first pivot arm 50 articulates relative to the second pivot arm 52, the reset pin 70 may contact the perimeter of the reset window 72, which may apply a selective force to the pin. As such, the interaction between the reset window 72 and the reset pin 70 may urge the movable ratchet member 56 to move between the engaged position and the disengaged position. In alternative embodiments, other mechanical interference means may be used to transition the movable ratchet member 56 between the engaged position and the disengaged position. Such interference mechanisms, for example, may include the use of catches, pins, rockers, or other similar devices known in the art.

FIGS. 5A-5C schematically illustrate the operation of the ratcheting pivot mechanism 34. More specifically these figures show the first pivoting arm 50 passing from an extreme rearward position (FIG. 5A), to an intermediate position (FIG. 5B), and on to an extreme forward position (FIG. 5C). Once in the extreme forward position (FIG. 5C), the movable ratchet member 56 may disengage from the fixed ratchet member 58 (as shown), and the pivot arm 50 may then freely reset (in a rearward direction 20) back to the initial extreme rearward position (FIG. 5A). In an embodiment, the rearward resetting motion (from FIG. 5C to FIG. 5A) may be aided by a spring, such as the return spring 36 shown in FIGS. 2 and 3. When the movable ratchet member 56 is engaged with the fixed ratchet member 58, such as shown in FIG. 5B, the first pivot arm 50 may be free to articulate in a forward direction 18, however, any movement in a rearward direction 20 may be restrained by the interaction of the gear teeth 60 of the respective ratchet members 56, 58.

The reversible bias of spring 62, which may cause a "toggling" effect of the movable ratchet member 56, may result from the geometric arrangement of the spring 62, movable ratchet member 56, and second pivot arm 52. As shown in FIGS. 5A-5C, the movable ratchet arm 56 may pivot with respect to the second pivot arm 52 at a point 78. A spring 62, such as for example, an omega-shaped spring 62, may then extend between the movable ratchet member 56 and the second pivot arm 52, and may generally exert an opposite, outward force against each respective component.

The spring force 80 applied to the movable ratchet member 56 may urge the member 56 to pivot either in an engaging or disengaging direction relative to the pivot point 78, according to its alignment with the radial axis 82. As shown in FIGS. 5A and 5B, when the movable ratchet member 56 is in an engaged position, the spring force 80 acts on the movable ratchet member 56 in a direction that would cause the member 56 to rotate in a clockwise (engaging) direction. As shown in FIG. 5C, when the movable ratchet member 56 is in a disengaged position, the spring force 80 is applied in a direction that would cause the member 56 to rotate in a counter-clockwise (disengaging) direction.

With such a spring configuration, there exists a position between the engaged and disengaged position where the spring force 80 may be perfectly aligned with the radial axis 82, and no biasing force is applied. This "neutral" position is generally an unstable position and is commonly referred to as the "over-center" position. As such, the movable ratchet member 56 in this configuration is bistable—that is, it is stable in two positions: either engaged (as shown in FIGS. 5A and 5B); or disengaged (as shown in FIG. 5C).

During operation, the pivot mechanism 34 may begin in an extreme rearward position, such as illustrated in FIG. 5A. A user may, for example, grasp the head-rest portion 12 (shown in FIGS. 1-3), and pull the head-rest forward 18. This force may cause the first pivot arm 50 to articulate in a forward direction 18 relative to the second pivot arm 52. The force provided by the user may work counter to the return spring's rearward urging, though may cause the fixed ratchet 58 to slide past the movable ratchet 56 as the pivot mechanism 34 transitions from FIG. 5A to 5B. Once in the configuration shown in FIG. 5B, the reset pin 70 may contact an end wall 90 of the reset window 72. The end wall 90 may be sloped in such a manner that contact forces between the pin 70 and the end wall 90 may urge the movable ratchet member 56 to pivot over-center from an engaged state (FIG. 5B) to a disengaged state (FIG. 5C).

Once disengaged, a force, such as provided by the return spring 36 (shown in FIGS. 2 and 3), may cause the head rest portion 12 (and attached first pivot arm 50) to rotate in a rearward direction 20 relative to the second pivot arm 52. Once the first pivot arm 50 returns to an extreme rearward position, as reflected in FIG. 5A, the reset pin 70 may contact a second end wall 92 of the reset window 72. Contact forces between the reset pin 70 and the second end wall 92 may urge the movable ratchet member 56 to pivot back over-center, from the disengaged state (FIG. 5C) to the engaged state (FIG. 5A).

While the best modes for carrying out the invention have been described in detail, those familiar with the art to which this invention relates will recognize various alternative designs and embodiments for practicing the invention within the scope of the appended claims. All directional references (e.g., upper, lower, upward, downward, left, right, leftward, rightward, above, below, clockwise, counter-clockwise, vertical, and horizontal) are only used for identification purposes to aid the reader's understanding of the present invention, and do not create limitations, particularly as to the position, orientation, or use of the invention. It is intended that all matter contained in the above description or shown in the accompanying drawings shall be interpreted as illustrative only and not as limiting.

The invention claimed is:

1. A ratcheting pivot mechanism for coupling a head rest portion of a vehicle head restraint assembly to a post portion of a vehicle head restraint assembly, the ratcheting pivot mechanism comprising:
   a first pivot arm having a fixed ratchet member, and defining a reset window;
   a second pivot arm pivotably connected to the first pivot arm;
   a movable ratchet member pivotably connected to the second pivot arm and configured to selectively engage the fixed ratchet member, the movable ratchet member including a reset pin; and
   a spring disposed between the second pivot arm and the movable ratchet member, the spring configured to apply an engaging force to the movable ratchet member when the movable ratchet member is in an engaged position, and the spring configured to apply a disengaging force to the movable ratchet member when the movable ratchet member is in a disengaged position; and
   wherein interaction between the reset window and the reset pin urges the movable ratchet member to move between the engaged position and the disengaged position.

2. The ratcheting pivot mechanism of claim 1, wherein the reset window includes a first end wall and a second end wall, the first and second end walls respectively being at opposite sides of the reset window; and
   wherein interaction between the reset pin and the first end wall urges the movable ratchet member into the engaged position, and interaction between the reset pin and the second end wall urges the movable ratchet member into the disengaged position.

3. The ratcheting pivot mechanism of claim 1, wherein the spring is an omega spring.

4. The ratcheting pivot mechanism of claim 1, wherein the fixed ratchet member and the movable ratchet member each comprise a plurality of ratchet teeth.

5. The ratcheting pivot mechanism of claim 1, wherein the movable ratchet member passes through an over-center position when transitioning between the engaged position and the disengaged position.

6. The ratcheting pivot mechanism of claim 5, wherein the movable ratchet member is bistable.

7. A ratcheting head restraint assembly comprising:
   a head rest portion;
   a post portion; and
   a ratcheting pivot mechanism coupling the head rest portion to the post portion, the ratcheting pivot mechanism including:
      a first pivot arm having a fixed ratchet member and connected to the head rest portion, the first pivot arm defining a reset window;
      a second pivot arm pivotably connected to the first pivot arm and connected to the post portion;
      a movable ratchet member pivotably connected to the second pivot arm and configured to selectively engage the fixed ratchet member, the movable ratchet member including a reset pin; and
      a spring disposed between the second pivot arm and the movable ratchet member, the spring configured to apply an engaging force to the movable ratchet member when the movable ratchet member is in an engaged position, and the spring configured to apply a disengaging force to the movable ratchet member when the movable ratchet member is in a disengaged position; and
      wherein interaction between the reset window and the reset pin urges the movable ratchet member to move between the engaged position and the disengaged position.

8. The ratcheting head restraint assembly of claim 7, wherein the reset window includes a first end wall and a second end wall, the first and second end walls respectively being at opposite sides of the reset window; and
   wherein interaction between the reset pin and the first end wall urges the movable ratchet member into the engaged position, and interaction between the reset pin and the second end wall urges the movable ratchet member into the disengaged position.

9. The ratcheting head restraint assembly of claim 7, wherein the spring is an omega spring.

10. The ratcheting head restraint assembly of claim 7, wherein the fixed ratchet member and the movable ratchet member each comprise a plurality of ratchet teeth.

11. The ratcheting head restraint assembly of claim 7, further comprising a return spring configured to urge the first pivot arm to rotate relative to the second pivot arm.

12. The ratcheting head restraint assembly of claim 7, wherein the head rest portion includes a cushion.

13. The ratcheting pivot mechanism of claim 7, wherein the movable ratchet member passes through an over-center position when transitioning between the engaged position and the disengaged position.

14. The ratcheting pivot mechanism of claim 13, wherein the movable ratchet member is bistable.

15. A ratcheting head restraint assembly comprising:
    a head rest portion;
    a post portion; and
    a ratcheting pivot mechanism coupling the head rest portion to the post portion, the ratcheting pivot mechanism including:
       a first pivot arm having a fixed ratchet member and defining a reset window;
       a second pivot arm pivotably connected to the first pivot arm;
       a movable ratchet member pivotably connected to the second pivot arm and configured to selectively engage the fixed ratchet member, the movable ratchet member including a reset pin;

a spring disposed between the second pivot arm and the movable ratchet member, the spring configured to apply an engaging force to the movable ratchet member when the movable ratchet member is in an engaged position, and the spring configured to apply a disengaging force to the movable ratchet member when the movable ratchet member is in a disengaged position;

wherein the movable ratchet member passes through an over-center position between the engaged position and the disengaged position; and wherein interaction between the reset window and the reset pin urges the movable ratchet member to move between the engaged position and the disengaged position.

16. The ratcheting pivot mechanism of claim 1, wherein the movable ratchet member is in contact with the fixed ratchet member when in an engaged position; and wherein the movable ratchet member is separated from the fixed ratchet member when in a disengaged position.

17. The ratcheting pivot mechanism of claim 16, wherein the engaging force urges the movable ratchet member against the fixed ratchet member; and wherein the disengaging force urges the movable ratchet member away from the fixed ratchet member.

18. The ratcheting pivot mechanism of claim 3, wherein the omega spring applies an opposite and opposing spring force against the ratchet member and the second pivot arm.

* * * * *